United States Patent
Bussiere et al.

[11] Patent Number: 5,340,040
[45] Date of Patent: Aug. 23, 1994

[54] DISINTEGRATION OF BALED CROP MATERIALS

[75] Inventors: Raymond Bussiere; Gilbert Topping, both of Vonda, Canada

[73] Assignee: High Line Manufacturing Inc., Vonda, Canada

[21] Appl. No.: 999,762

[22] Filed: Dec. 31, 1992

[51] Int. Cl.$^5$ ............................................. A01F 29/00
[52] U.S. Cl. ................................. 241/101.7; 241/605
[58] Field of Search .................. 241/101.7, 194, 279, 241/280, 605

[56] References Cited

U.S. PATENT DOCUMENTS

| | | |
|---|---|---|
| 2,952,466 | 4/1957 | Carlson et al. |
| 3,966,128 | 6/1976 | Anderson et al. |
| 3,999,674 | 12/1976 | Meitl |
| 4,094,427 | 6/1978 | White et al. |
| 4,094,428 | 6/1978 | White et al. |
| 4,101,081 | 7/1978 | Ritter et al. |
| 4,134,554 | 1/1979 | Morlock |
| 4,151,961 | 5/1979 | Makofka et al. |
| 4,218,022 | 8/1980 | Boehm et al. |
| 4,227,654 | 10/1980 | Seefeld et al. |
| 4,449,672 | 5/1984 | Morlock et al. ............... 241/101.7 |
| 4,830,292 | 5/1989 | Frey ............................. 241/280 X |
| 4,951,983 | 8/1990 | Loppoli et al. ............... 241/101.7 |

OTHER PUBLICATIONS

Brochure from Kverneland entitled Silachop.
Brochure from Henke entitled Kwikmixer.
Brochure from Big John entitled Round Bale Transport Feeder.
Brochure from Krudson entitled Round Bale to Mixer Processor.
Brochure from Hesston entitled Model BP-25 Bale Processor.
Brochure from New Holland entitled Model 175 Round Bale Feeder.
Brochure from Knight entitled 700 Series Slinger.
Brochure from New Holland entitled Side Delivery Manure Spreaders.
Brochure from Deweze entitled Super Slicer.
Brochure from Gualdi entitled Unroller Distributor For Round Bales.
Vermeer Manufacturing Company—Brochure.

*Primary Examiner*—Douglas D. Watts
*Attorney, Agent, or Firm*—Adrian D. Battison; Stanley G. Ade; Murray E. Thrift

[57] ABSTRACT

Apparatus for disintegrating baled material in the form of large cylindrical bales, a collection of small rectangular bales or large rectangular bales includes a hopper for receiving the baled material. At the base of the hopper is provided a flail cylinder which engages the material and sweeps it around to an ejection slot along one side of the hopper. Above the flail cylinder is provided a pair of support rollers each on a respective side of the flail cylinder with the axes parallel to the flail cylinder. The rollers can be rotated in either direction to provide a vigorous rotating action of the baled material despite flat edges of the baled material. The rollers are mounted so that they can lift from the surface of the hopper if material passes between the underside of the roller and the inside surface of the hopper on its way to the flail cylinder.

24 Claims, 5 Drawing Sheets

DISINTEGRATION OF BALED CROP MATERIALS

BACKGROUND OF THE INVENTION

This invention relates to an apparatus for disintegrating baled crop materials.

Crop materials such as hay and other forage materials or straw are often baled for storage and transportation. In some cases when it is necessary for the baled material to be utilized, it is necessary for the baled material to be disintegrated from the bale structure for breaking into a row of feed material, dispensing into feed bunks or in some cases for spreading such as for bedding or the like.

One machine that is currently available for this process is manufactured by Haybuster of North Dakota and is shown in detail in U.S. Pat. No. 4,449,672.

This device includes a flail drum mounted at the base of a cradle. Inclined bars extend from a position to one side of the flail drum upwardly and toward the opposed side so as to define a grate against which a bale can be pressed for engagement with the rotating flails of the flail drum. The bale is moved into engagement with the grate and therefore with the flail drum by a belt conveyor which extends from the base of the grate outwardly toward the side of the flail drum and thus provides a substantially horizontal platform on which the bale is resting by gravity. Rotation of the belt thus drives the bale toward the grate. A support surface is positioned on the opposed side from the belt for engaging a side surface of the bale as it is driven toward the grate. The belt, the grate and the side surface thus form a cradle within which the bail is intended to rotate, thus causing the periphery of the bale to move past the flail drum.

The machine of Haybuster is designed specifically for use with the widely used large cylindrical bale and is not designed for other types of bales such as the small rectangular bale or the large rectangular bale, both of which are used by some farmers.

Bales when initially formed, are properly cylindrical and thus it is relatively easy to rotate the bale about its axis by the simple action of the belt against the underside of the bale.

However, when a bale has been stored for an extended period, particularly in winter, the bale can become flat on one side and in addition the bale can become deeply frozen, particularly at the flat side in engagement with the ground. The bale therefore becomes much more difficult to rotate and can become jammed in the Haybuster machine so that no further rotation of the bale occurs, thus halting the action of the flail drum against the bale until the rotation can be restarted. It is known, therefore, that the Haybuster machine can fail to disintegrate some bales which are of the type which are particularly deformed due to the storage condition.

Furthermore, the Haybuster machine has some difficulty in handling loose materials since the belt provides insufficient force to push the loose materials into the flail drum. Cylindrical bales are formed in two different types, one of which is the hard core type which is carefully rolled throughout its formation to ensure a proper rolling action at the center of the bale, thus providing a relatively high density throughout the bale. These bales can generally be rotated as they are disintegrated since there is sufficient density and mass in the final portion of the bale to allow it to be continued in its rotation. A second type of bale, however, is of the soft center type in which there is little rolling action on the center part of the bale so that it forms simply a mass or pile of the crop material with the outer materials being rolled around the inner core. Bales of this type are much more difficult to disintegrate since once the outer layers have gone there is remaining simply a pile of soft crop material which has insufficient mass to force it into the flail drum.

It is one object of the present invention, therefore, to provide an apparatus for disintegrating baled crop materials which provides an improved or more aggressive disintegration action.

According to the first aspect of the invention there is provided an apparatus for disintegrating baled crop materials comprising a hopper for receiving and containing the baled crop materials, the hopper having two side walls which converge downwardly and inwardly toward a base portion extending along a longitudinal direction of the hopper, a disintegration member mounted in the hopper at the base portion for rotation about an axis longitudinal of the hopper and carrying a plurality of radially extending crop material grasping members for engaging and grasping the crop material as the disintegration member rotates, an exit in the hopper at the base portion arranged longitudinally of the disintegration member for expulsion of the grasped crop material from the hopper, and two support members for the baled crop material, each mounted in the hopper and extending generally longitudinally of the hopper, and each mounted so as to have a support surface thereof raised from the disintegration member and on a respective side thereof so as to define an opening between the support members through which the baled crop material can be presented to the disintegration member for engagement therewith, each support member defining said support surface which is rotatable about an axis longitudinal of the hopper whereby the baled crop material can be rotated within the hopper to pass across said opening for engagement of different parts of the baled crop material with the disintegration member.

According to a second aspect of the invention, there is provided an apparatus for disintegrating baled crop materials comprising a hopper for receiving and containing the baled crop materials, the hopper having two side walls which converge downwardly and inwardly toward a base portion extending along a longitudinal direction of the hopper, a disintegration member mounted in the hopper at the base portion for rotation about an axis longitudinal of the hopper and carrying a plurality of radially extending crop material grasping members for engaging and grasping the crop material as the disintegration member rotates, an exit in the hopper at the base portion arranged longitudinally of the disintegration member for expulsion of the grasped crop material from the hopper, the disintegration member comprising a substantially cylindrical drum having a plurality of pivot pins thereon each having a pivot axis longitudinal of the drum and a plurality of flails, each flail including an end portion engaging a respective one of the pivot pins for pivotal movement about the axis of the pivot pin and an outer portion for engaging the baled crop material, each flail including a blade portion lying in a plane generally longitudinal of the drum with the outer portion being curved from the blade portion forwardly of the direction of rotation of the drum to form a tooth section for engaging into the baled crop material, the blade portion extending to a position on the pivot pin rearwardly of the pivot axis of the pivot pin so that centrifugal force tends to incline the blade portion forwardly from the position rearwardly of the pivot axis to the tooth portion forwardly of the pivot axis to maintain the tooth portion in an aggressive cutting mode.

One embodiment of the invention will now be described in conjunction with the accompanying drawings in which:

DETAILED DESCRIPTION

Figure 1:
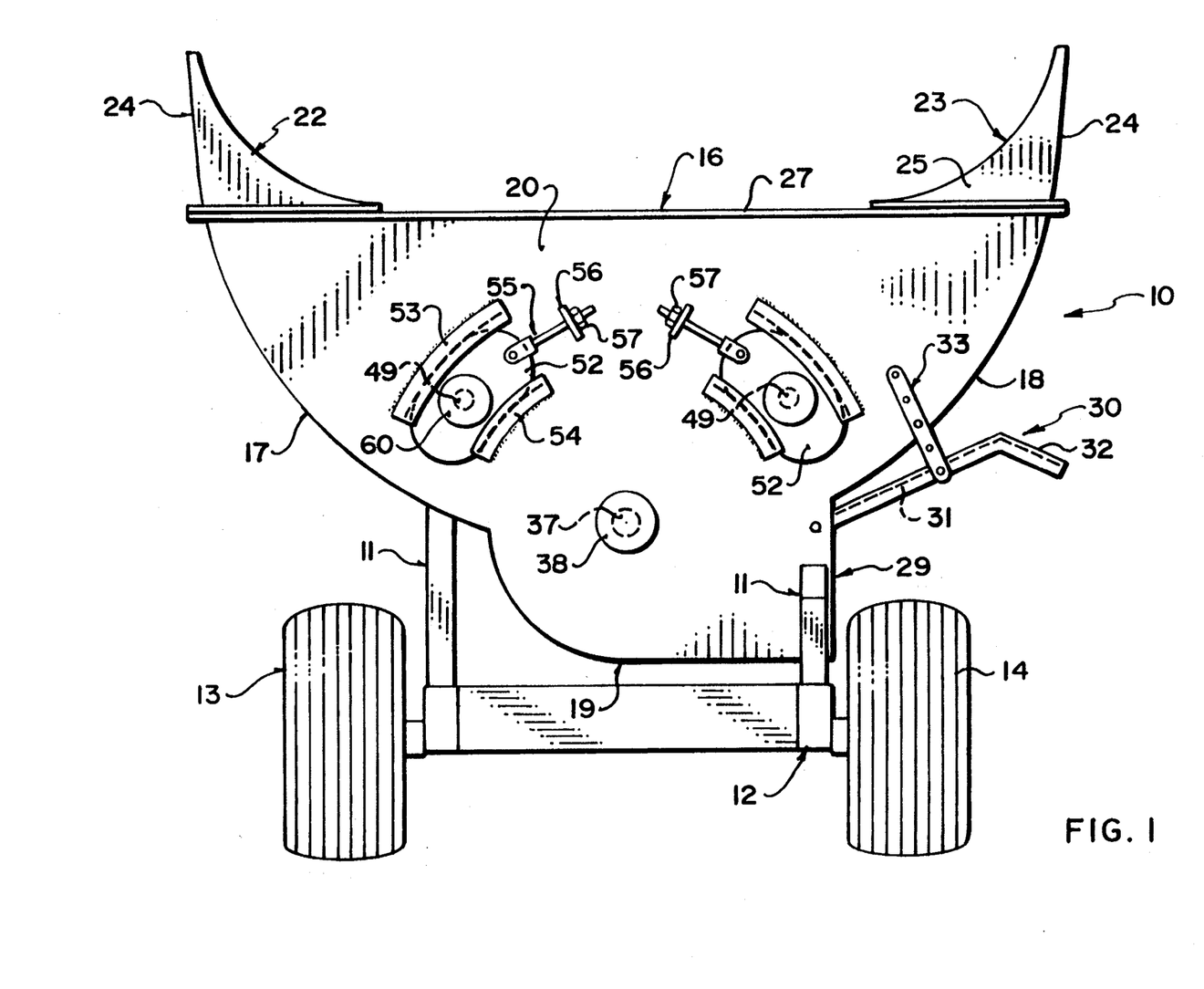
FIG. 1 is a front elevational view of a bale disintegration apparatus according to the present invention.
Figure 2:
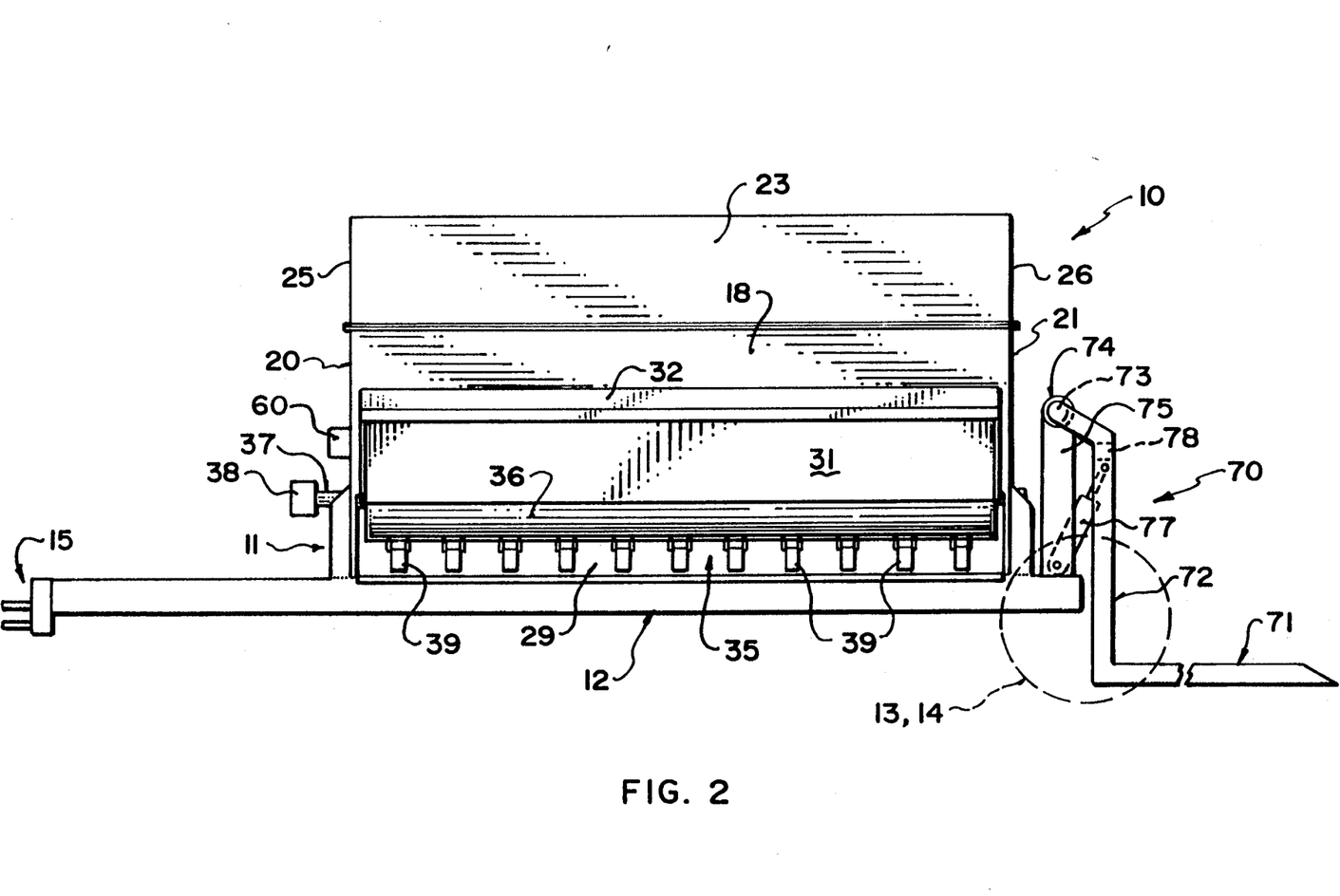
FIG. 2 is a side elevational view of the apparatus of FIG. 1.
Figure 3:
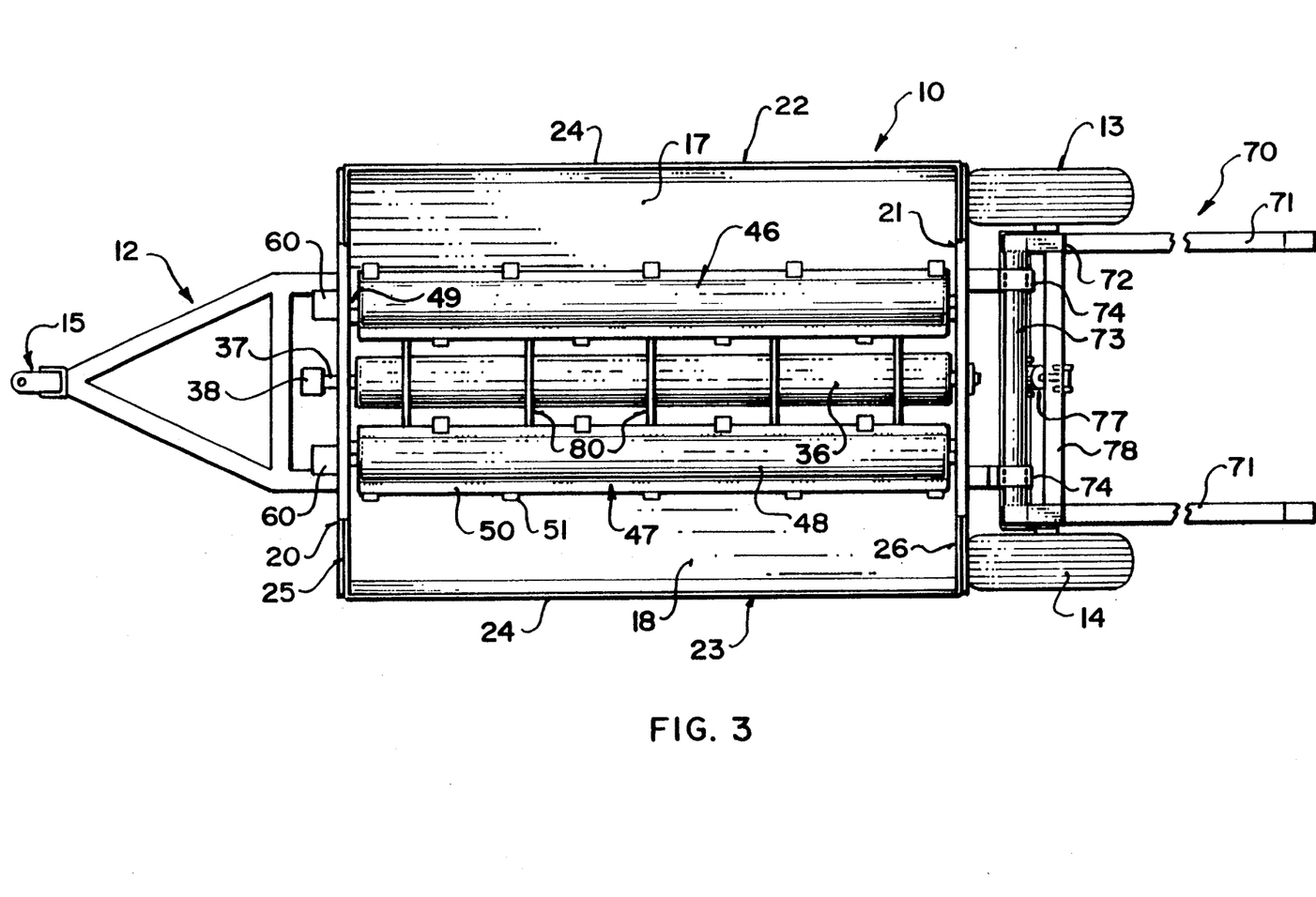
FIG. 3 is a top plan view of the apparatus of FIG. 1.

Turning firstly to FIGS. 1, 2 and 3, the apparatus for disintegration bales comprises a hopper generally indicated at 10 mounted on a frame 11. The frame 11 comprises a number of rigid longitudinal and transverse support beams, the details of which are not shown, providing structural strength for the hopper and allowing the hopper to be mounted upon a longitudinal beam structure 12. The beam structure includes a pair of ground wheels 13 and 14 mounted at a rear part of the longitudinal beam structure for transportation of the hopper across the ground. A forward end of the beam structures includes a hitch 15 of conventional arrangement by which the vehicle can be towed.

The hopper 10 includes an integral lower hopper portion 16 including a pair of side walls 17 and 18 converging from an upper open mouth to a base section 19. The side walls 17 and 18 lie approximately on an imaginary cylinder having an axis vertically above the base portion 19 so as to define a generally semi-cylindrical receptacle for receiving the peripheral surface of a cylindrical bale. The hopper further includes end walls 20 and 21 defining ends of the part cylindrical receptacle.

At the upper end of each of the side walls 17 and 18 is mounted a shield member 22, 23 including an outer wall 24 following the curvature of the respective side wall 17, 18, and end wall portions 25 and 26 each extending along a portion of the respective end wall 20, 21. The shields 22 and 23 thus assist in confining an upper part of a bale received within the lower part cylindrical receptacle. The end walls 20 and 21 and the side walls 17 and 18 terminate in a horizontal upper flange 27 which surrounds the open upper mouth of the part cylindrical receptacle defining the hopper.

Figure 4:
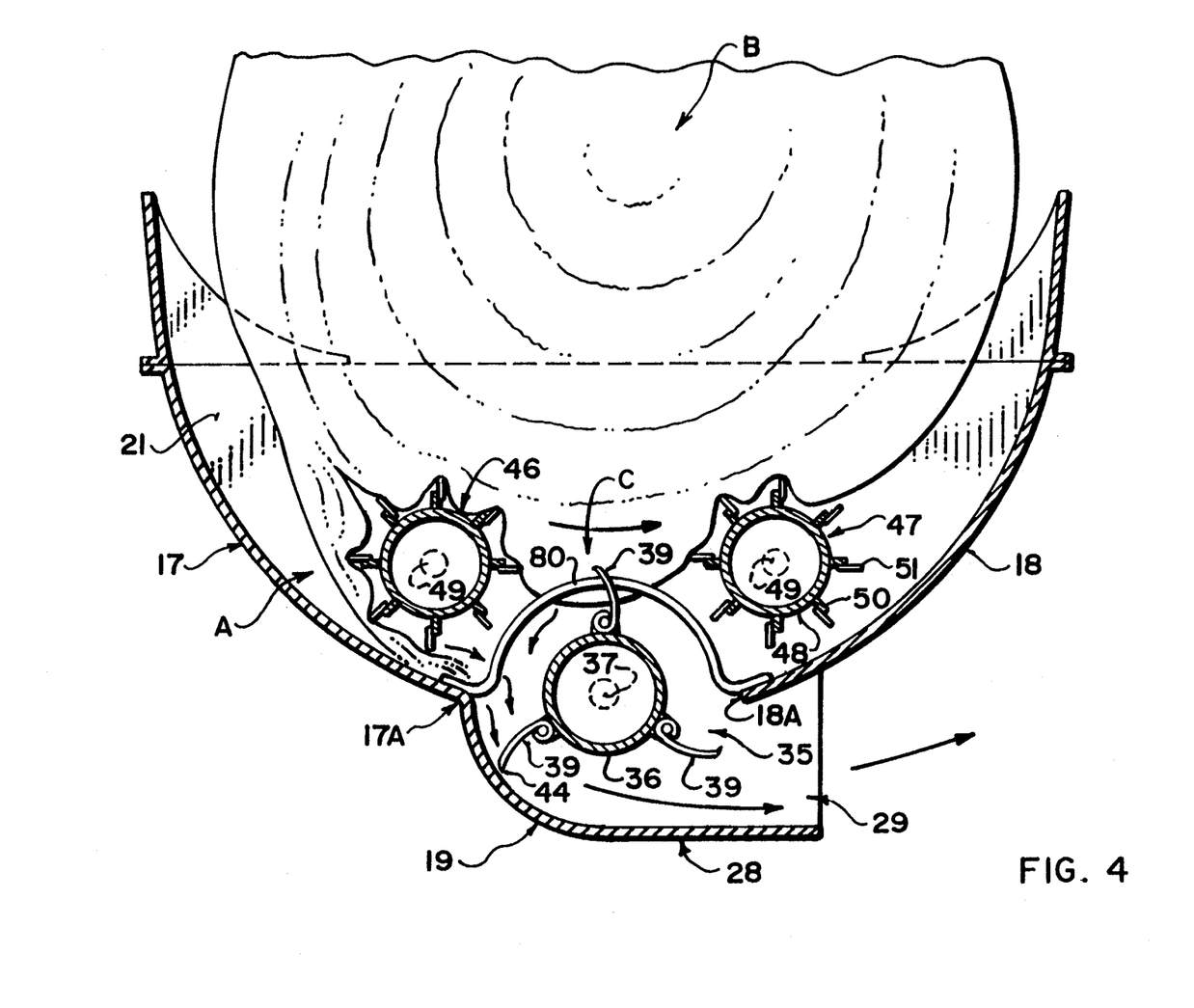
FIG. 4 is a transverse cross-sectional view of the apparatus of FIG. 1 showing the action of the support rollers and disintegration member on the bale.

The base portion 19 forms a part cylindrical wall having a radius of curvature less than that of the side walls 17 and 18 so as to define a downwardly projecting section underneath the locus of curvature of the side walls 17 and 18. As best shown in FIG. 4, the side wall 17 terminates at a lower edge 17A integrally connected to the base portion 19 which curves downwardly therefrom at the reduced radius of curvature to an ejection section 28. The ejection section 28 defines a horizontal wall extending from the lowermost edge of the base portion 19 outwardly toward one side of the hopper at a position underlying the side wall 18. The side wall 18 terminates at a lowermost edge 18A which is above the horizontal wall of the ejection section thus defining an ejection slot 29 underneath the side wall 18. This ejection slot is thus arranged so that material carried by the disintegration member described hereinafter is transported over the upper surface of the wall defining the bottom portion and over the wall defining the bottom of the ejection slot so as to direct this material horizontally outwardly to one side of the hopper.

A guide surface generally indicated at 30 is mounted at the top of the ejection slot and forms a first flat wall 31 and a second flat wall 32 arranged at an angle to the first and inclined downwardly therefrom. This guide surface can be moved to a raised position as shown in FIG. 1 and FIG. 2 or can be lowered by an adjustment strap 33. The height of the guide surface changes the angle of discharge of the materials from the ejection slot.

Within the base portion 19 is mounted the disintegration member generally indicated at 35. This comprises a cylindrical drum 36 mounted for rotation about a horizontal axis longitudinal of the hopper and forming the axis of curvature of the base portion 19. The drum 36 is thus mounted on a shaft 37 carried in suitable bearings in the end walls 20 and 21. The shaft 37 is driven by a PTO coupling 38 for connection to a PTO drive from a tractor.

The disintegration member comprises the cylinder 36 together with a plurality of flails 39 which are carried on the cylinder for rotation therewith. For convenience of illustration the flails are omitted from FIG. 3 but it will be apparent that the flails are arranged in spaced relation around the surface of the drum, spaced both axially and angularly to form an array which will act in a grinding action across the full periphery of a bale presented to the disintegration member.

Figure 5:
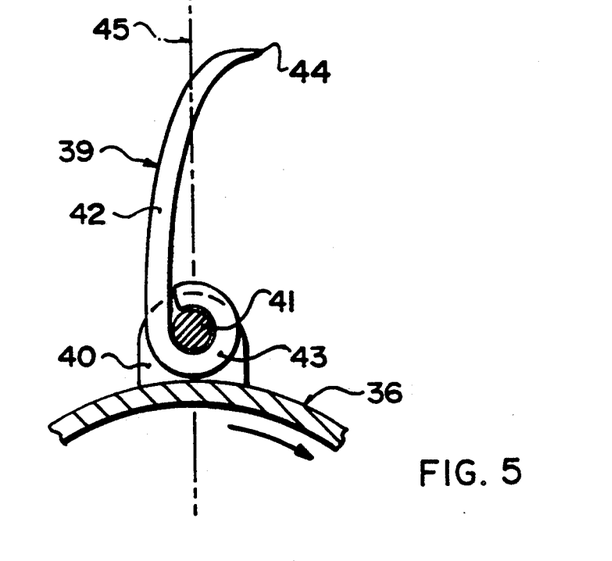
FIG. 5 is a cross-sectional view through one part of the disintegration member showing one of the flails, the cross section being taken along the lines 5—5 of FIG. 6.
Figure 6:
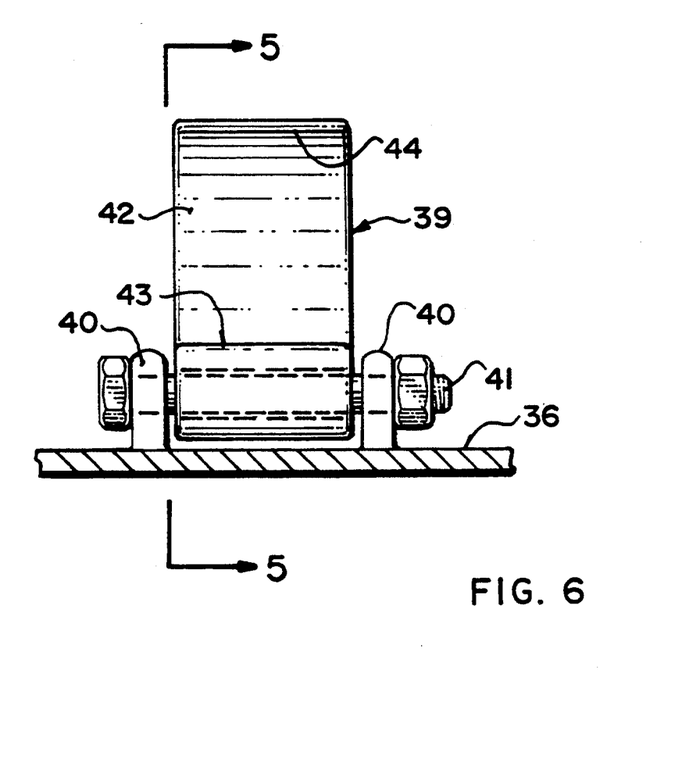
FIG. 6 is a front elevational view of the flail of FIG. 5.

Turning now to FIGS. 5 and 6, the construction of a single one of the flails is shown. This comprises a pair of lugs 40 which are welded to the outer surface of the cylindrical drum 36. The lugs each include a hole with the holes aligned to receive a transverse pivot pin 41 having an axis longitudinal of the cylindrical drum. The flail 39 is mounted on the pin 41 for pivotal movement freely about the axis of the pin. The flail includes a blade portion 42 which is generally flat, with a width of the order of 2 inches with the blade portion lying in a plane longitudinal of the drum. At an inner end of the blade portion is provided a hook section 43 for engaging around the pin 41. At the outer end of the blade portion, there is provided a cutting edge 44 which is defined by curving the blade portion forwardly so that the edge is arranged substantially at right angles to the main portion of the blade 42.

As best shown in FIG. 5, the blade portion 42 connects to the hook portion 43 at a position rearwardly of the axis of the pin 41 relative to the direction of rotation of the drum. From this rear position, the blade portion extends outwardly and then forwardly relative to a line 45 at right angles to the surface of the drum. As the center of gravity of the flail therefore tends under the centrifugal force from the rotation of the drum to lie on the line 45, this causes the edge 44 to be positioned forwardly of that line during the rotation. The centrifugal force thus tends to cause the edge 44 to be thrust forwardly so that it maintains an aggressive attitude in the cutting action. This forward motion caused by the centrifugal force counteracts the rearward motion generated by the engagement of the blade and particularly the cutting edge with the materials as the drum rotates.

Within the hopper is also mounted a pair of support rollers 46 and 47. The support rollers are mounted on respective sides of the disintegration member 35 and at a height so that they define a support surface for a bale which is arranged above the action of the disintegration member. Each of the support rollers includes a cylindrical drum 48 mounted on a shaft 49 for rotation about an axis of the shaft. The shafts 49 lie parallel to the shaft 37 at a height above the shaft 37 and equidistantly spaced on either side of the shaft 37. Each of the drums 48 includes a plurality of longitudinally extending flanges 50 extending radially outwardly from the drum at angularly spaced positions therearound. Along each of the flanges 50 is provided a plurality of axially spaced tab member 51 which are bolted onto the respective flange so as to extend outwardly therefrom to provide a more aggressive action in engaging the surface of the bale.

The shafts 49 are each mounted in bearings (not shown) carried in end plates 52. At each end of each of the shafts, therefore, there is provided an end plate 52 which is arranged on the outside surface of the end wall 20, 21 as best shown in FIG. 1. Each end plate 52 is carried in a pair of slide guides 53 and 54 which are attached to the end wall 20. The slide guides 53 and 54 thus define a slot into which the edges of the end plate 52 engage so that the end plate is free to slide across the outside surface of the end wall 20. A suitable hole is provided in the end wall to allow the shaft to move relative to the end wall. The slide guides 53 and 54 are shaped so as to curve around the axis of the shaft 37 so that the shaft 49 moves in an arc around the axis of the shaft 37 thus maintaining the rollers at constant distance from the disintegration member. As the slide guides 53 and 54 are inclined upwardly and inwardly, gravity tends to cause the rollers to fall to the lowermost position adjacent to but spaced from the respective side wall 17, 18, as shown in FIG. 4. Upward pressure on the roller caused by material engaged between the roller and the inside surface of the side wall can however allow the roller to lift symetrically or only at one end as required by the sliding action of the plate 52 within the slide guides 53 and 54. The lowermost position of the roller is adjusted by a pivot link 55 which passes through a flange 56 welded to the end wall 20. A nut 57 on the link 55 limits the downward movement of the roller but allows upward movement as required.

The shaft 49 is driven by a hydraulic motor 60 mounted on the end plate 52. The hydraulic motors 60 are coupled to the hydraulic system of the tractor towing the vehicle including the hopper and are arranged so that the rollers can be driven simultaneously either in a clockwise direction or counter-clockwise direction as required.

At a rear end of the hopper is provided a loading system generally indicated at 70. The loading system comprises a pair of bale forks 71 which project rearwardly from the hopper. The bale forks are mounted on vertical legs 72 which are coupled together for pivotal movement about a horizontal shaft 73 mounted above the frame. The horizontal shaft 73 is carried in a pair of collars 74, each of which is mounted at the top of a post 75 carried on the frame and extending vertically upwardly along the end wall 21 of the hopper. The shaft 73 thus forms an axle. The leg 72 extends rearwardly and downwardly in an initial portion from the shaft and then extends vertically downwardly in the initial rest position of the loading device. A cylinder 77 extends from the frame to a transverse beam 78 interconnecting the legs 72. Actuation of the cylinder 77 thus causes the legs 72 and the forks 71 to pivot about the axle. In a loading action, therefore, the vehicle is backed up to a bale so that the forks pass either side of the bale with the axis of the bale lying longitudinal of the hopper. The cylinder 77 is then actuated to pivot the bale forks and the legs 72 about the horizontal axle thus lifting the bale and at the same time pivoting the axis of the bale from its initial horizontal position upwardly to a substantially vertical position. In this vertical position of the axis of the bale, the end of the bale sits on the legs 72 which are then extending horizontal rearwardly from the hopper. Once the legs turn about the axle to a small further angle, the bale tends to slide from the legs into the hopper and its axis is pivoted back over the hopper allowing the bale to drop into the hopper with its axis turned through 180° and lying longitudinal of the hopper.

In an alternative arrangement (not shown), the frame can be mounted upon a conventional bale wagon with a similar lifting system which engages under bales carried forwardly on the wagon to the hopper. In this arrangement, therefore, the bale is again lifted from the wagon and turned over and dumped into the hopper for disintegration.

Once loaded, the bale sits on the support rollers 46 and 47 which are positioned at either side of the central axis of the bale so that a portion of the bale projects through the area or open space between the two rollers toward the disintegration member. Adjustment of the height of the rollers relative to the disintegration member of course varies the amount of the bale which is presented to the flails of the disintegration member and thus varies the aggressiveness of the grinding or cutting action to vary the rate of feed.

With the bale sitting on the rollers, the rollers can be rotated so that the angular portion of the bale presented to the disintegration member is rotated to provide further feed to the disintegration member. In cases where the bale is relatively fresh and easy to disintegrate, it is simply a matter of rotating the bale on the rollers at a speed governed by the rate of rotation of the rollers and this feeds the bale gradually to the disintegration member allowing the material to be cut away and dispensed through the ejection slot.

In situations where the bale is difficult to rotate and difficult to break up, an initial action of the support rollers to rotate the bale firstly in one direction and then to rotate it in an opposed direction can cause an initial unrolling of the bale to open up the bale for subsequent disintegration when the material reaches the area between the rollers. The area between the rollers is indicated at C, the bale is indicated at B and an additional area for feeding the material is indicated at A. The area A is located between the roller and the inside surface of the side wall and in some cases the unrolling of the bale causes this material to be forced between the roller and the side wall to engage the disintegration member at a position underneath the roller. The material again is grasped by the flails as they pass this area and cause to be ejected from the ejection slot.

The disintegration device of the present invention therefore is particularly effective in disintegrating bales which are difficult to rotate due to their collapse from the initial cylindrical shape. A bale which has a flat side can therefore initially be opened up by the aggressive driving action of the rollers which cause the bale to rotate within the hopper. The bale is vigorously grasped by the flanges and the tab members to provide this rotating action so that there is little danger of the flat side of the deformed bale becoming wedged over the disintegration member. The unrolling action caused by the vigorous rotation of the bale assists in breaking up the bale and causing the portion to be fed through the area A as previously described.

In order to prevent a last part of the bale from being dispensed as a lump through the area C between the support rollers, a plurality of hoops 80 is provided. Each hoop is shaped into a part circular path and has two ends with each end welded to a lowermost edge 17A, 18A of a respective one of the side walls. Thus, as best shown in FIG. 4, the hoop 80 extends from a lowermost end attached to the edge 17A and then follows a circular path over the drum 36 but within the locus of the movement of the cutting edges 44. The second end of the hoop 80 passes underneath the roller 47 and is attached to the edge of the side wall 18 at a position above the expulsion slot. The hoops 80 therefore basically do not provide any support for the bale during its disintegration action but simply act to bar the escape of the last remnants of the bale so that it is necessary for the whole of the bale to be disintegrated before it can be expelled from the disintegration member.

The aggressive turning action provided by the supporting rollers allows the device to operate not only on cylindrical bales properly oriented, but also on cylindrical bales which are oriented in the opposed direction, also on a collection of small rectangular bales and also on the large rectangular bales which are commonly used by farmers. The vigorous rolling action causes the mass of baled material to rotate so that despite flat sides and apexes in the material, the baled material is rotated past the disintegration member.

When disintegrated, the material is ejected from the ejection slot and can be guided by the guide chute 30 to be spread vigorously across the ground or to form a narrow windrow if the chute is moved to the lower position. The shape of the flails including the broad, transverse width and the forwardly presented cutting edge, provides a vigorous action on the material allowing a wide spread of the material if released by the chute in the spreading action.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. Apparatus for disintegrating baled crop materials comprising a hopper for receiving and containing the baled crop materials, the hopper having two side walls which converge downwardly and inwardly toward a base portion extending along a longitudinal direction of the hopper, a disintegration member mounted in the hopper at the base portion for rotation about an axis longitudinal of the hopper and carrying a plurality of radially extending crop material grasping members for engaging and grasping the crop material as the disintegration member rotates elongate exit means in the hopper at the base portion arranged longitudinally of the disintegration member for expulsion of the grasped crop material from the hopper, and two support members for the baled crop material, mounting means mounting each of said support members in the hopper so as to extend generally longitudinally of the hopper and so as to have a support surface thereof raised from the disintegration member and on a respective side thereof so as to define an opening between the support members through which the baled crop material can be presented to the disintegration member for engagement therewith, each support member defining said support surface which is rotatable about an axis longitudinal of the hopper whereby the baled crop material can be rotated within the hopper to pass across said opening for engagement of different parts of the baled crop material with the disintegration member, each side wall of the hopper including a wall portion thereof extending underneath a respective one of the support members to a position adjacent the disintegration member so as to guide crop material passing under the support member to the disintegration members at a position thereon for engagement by said grasping members, said elongate exit means communicating with the disintegration member at a height thereon below said wall portions of said side walls.

2. The apparatus according to claim 1 wherein each of the support members comprises a roller rotatable about a single axis longitudinal of the hopper with the axes of the rollers being arranged parallel and parallel to the axis of rotation of the disintegration member.

3. The apparatus according to claim 2 wherein each of the rollers includes a plurality of flanges at angularly spaced positions therearound, each flange projecting outwardly from a cylindrical support surface of the roller.

4. The apparatus according to claim 3 wherein each flange has a plurality of outwardly projecting members at spaced positions longitudinally thereof.

5. The apparatus according to claim 1 including means for driving rotation of the support members, the driving means being reversible so as to reverse the angular direction of rotation of both of the support members so as to reverse the direction of rotation of the baled crop material within the hopper.

6. The apparatus according to claim 1 wherein said mounting means mounts each of said support members on the hopper for movement in a direction to increase the spacing between the underside of the support surface of the respective support member and the adjacent wall portion of the respective side wall.

7. The apparatus according to claim 6 wherein each of the support members is mounted on a pair of end plates, each end plate being mounted on a respective one of two end walls of the hopper for sliding movement relative thereto.

8. The apparatus according to claim 6 including means guiding the lifting movement of the support members, the guiding means being arranged to cause each of the support members to move in an arcuate movement around the axis of rotation of the disintegration member so as to maintain a constant distance between the disintegration member and the respective support member.

9. The apparatus according to claim 1 wherein each of the side walls of the hopper is shaped in cross section substantially as an arc of a circle surrounding a longitudinal axis of the hopper parallel to and spaced above the axis of the disintegration member and wherein the base portion is part cylindrical surrounding the axis of the disintegration member and having a radius of curvature substantially equal to an outside radius of the disintegration member.

10. The apparatus according to claim 9 wherein the elongate exit means is arranged at one side of the base portion below the respective side wall.

11. The apparatus according to claim 1 including a plurality of axially spaced bars arranged in the opening between the support members so as to engage the baled crop material therebetween, the bars being mounted on the wall portions of the side walls at a position thereon immediately adjacent the base portion.

12. The apparatus according to claim 1 wherein the disintegration member comprises a substantially cylindrical drum having a plurality of flails mounted thereon and wherein the drum carries a plurality of pivot pins each having a pivot axis longitudinal of the drum and wherein each flail includes an end portion engaging the pivot pin for pivotal movement about the axis of the pivot pin and an outer portion for engaging the baled crop material, the flail including a blade portion lying in a plane generally longitudinal of the drum with the outer portion being curved from the blade portion forwardly of the direction of rotation of the drum to form a tooth section for engaging into the baled crop material, the blade portion extending to a position on the pivot pin rearwardly of the pivot axis of the pivot pin so that centrifugal force tends to incline the blade portion forwardly from the position rearwardly of the pivot axis to the tooth portion forwardly of the pivot axis to maintain the tooth portion in an aggressive cutting mode.

13. The apparatus according to claim 12 wherein the drum carries a plurality of pivot pins each having a pivot axis longitudinal of the drum and wherein each flail includes an end portion engaging the pivot pin for pivotal movement about the axis of the pivot pin and an outer portion for engaging the baled crop material, the flail including a blade portion lying in a plane generally longitudinal of the drum with the outer portion being curved from the blade portion forwardly of the direction of rotation of the drum to form a tooth section for engaging into the baled crop material, the blade portion extending to a position on the pivot pin rearwardly of the pivot axis of the pivot pin so that centrifugal force tends to incline the blade portion forwardly from the position rearwardly of the pivot axis to the tooth portion forwardly of the pivot axis to maintain the tooth portion in an aggressive cutting mode.

14. An apparatus for disintegrating baled crop materials comprising a hopper for receiving and containing the baled crop materials, the hopper having two side walls which converge downwardly and inwardly toward a base portion extending along a longitudinal direction of the hopper, a disintegration member mounted in the hopper at the base portion for rotation about an axis longitudinal of the hopper and carrying a plurality of generally radially extending flails for engaging the crop material as the disintegration member rotates, an exit in the hopper at the base portion arranged longitudinally of the disintegration member for expulsion of the grasped crop material from the hopper, the disintegration member comprising a substantially cylindrical drum having a plurality of pivot pins thereon each having a pivot axis longitudinal of the drum and said plurality of flails, each flail including an end portion engaging a respective one of the pivot pins for pivotal movement about the axis of the pivot pin and an outer portion for engaging the baled crop material, each flail including a blade portion lying in a plane generally longitudinal of the drum with the outer portion being curved from the blade portion forwardly of the direction of rotation of the drum to form a tooth section for engaging into the baled crop material, the blade portion extending to a position on the pivot pin rearwardly of the pivot axis of the pivot pin so that centrifugal force tends to incline the blade portion forwardly from the position rearwardly of the pivot axis to the tooth portion forwardly of the pivot axis to maintain the tooth portion in an aggressive cutting mode.

15. Apparatus for disintegrating baled crop materials comprising a hopper for receiving and containing the baled crop materials, the hopper having two side walls which converge downwardly and inwardly toward a base portion extending along a longitudinal direction of the hopper, a disintegration member mounted in the hopper at the base portion for rotation about an axis longitudinal of the hopper and carrying a plurality of generally radially extending crop material grasping members for engaging and grasping the crop material as the disintegration member rotates, an exit in the hopper at the base portion arranged longitudinally of the disintegration member for expulsion of the grasped crop material from the hopper, two support rollers for the baled crop material, each mounted in the hopper and extending generally longitudinally of the hopper, and each mounted so as to have a support surface thereof raised from the disintegration member and on a respective side thereof so as to define an opening between the support rollers through which the baled crop material can be presented to the disintegration member for engagement therewith, each support roller defining said support surface which is rotatable about an axis longitudinal of the hopper whereby the baled crop material can be rotated within the hopper to pass across said opening for engagement of different parts of the baled crop material with the disintegration member, each of the support rollers being rotatable about a single axis longitudinal of hopper with the axes of the rollers being arranged parallel and parallel to the axis of rotation of the disintegration member, means for driving rotation of the support rollers, the driving means being reversible so as to reverse the angular direction of rotation of both of the rollers so as to reverse the direction of rotation of baled crop material within the hopper, and means mounting each of the support members in the hopper such that the support surface thereof is spaced from an inside surface of the hopper so as to allow crop material to pass between an underside of the support member and an adjacent portion of the inner surface of the hopper, said mounting means being arranged to mount the support rollers on the hopper for movement of each of the support rollers in a direction to increase the spacing between the underside of the respective support surface and the adjacent portion of the hopper surface.

16. Apparatus for disintegrating baled crop materials comprising a hopper for receiving and containing the baled crop materials, the hopper having two side walls which converge downwardly and inwardly toward a base portion extending along a longitudinal direction of the hopper, a disintegration member mounted in the hopper at the base portion for rotation about an axis longitudinal of the hopper and carrying a plurality of radially extending crop material grasping members for engaging and grasping the crop material as the disintegration member rotates elongate, exit means in the hopper at the base portion arranged longitudinally of the disintegration member for expulsion of the grasped crop material from the hopper, and two support members for the baled crop material, mounting means mounting each of said support members in the hopper so as to extend generally longitudinally of the hopper and so as to have a support surface thereof raised from the disintegration member and on a respective side thereof so as to define an opening between the support members through which the baled crop material can be presented to the disintegration member for engagement therewith, each support member defining said support surface which is rotatable about an axis longitudinal of the hopper whereby the baled crop material can be rotated within the hopper to pass across said opening for engagement of different parts of the baled crop material with the disintegration member, the support surface of at least one of the support members being spaced from an inside surface of the hopper so as to allow crop material to pass between an underside of said at least one of the support members and an adjacent portion of the side surface of the hopper, wherein said mounting means mounts said one of the support members on the hopper for movement in a direction to increase the spacing between the underside of the support surface and the adjacent portion of the inside surface.

17. The apparatus according to claim 16 wherein each of the support members comprises a roller rotatable about a single axis longitudinal of the hopper with the axes of the rollers being arranged parallel and parallel to the axis of rotation of the disintegration member.

18. The apparatus according to claim 17 wherein each of the rollers includes a plurality of flanges at angularly spaced positions therearound, each flange projecting outwardly from a cylindrical support surface of the roller.

19. The apparatus according to claim 18 wherein each flange has a plurality of outwardly projecting members at spaced positions longitudinally thereof.

20. The apparatus according to claim 16 including means for driving rotation of the support members, the driving means being reversible so as to reverse the angular direction of rotation of both of the support members so as to reverse the direction of rotation of the baled crop material within the hopper.

21. The apparatus according to claim 16 wherein each of the support members is mounted on a pair of end plates, each end plate being mounted on a respective one of two end walls of the hopper for sliding movement relative thereto.

22. The apparatus according to claim 16 including means guiding the lifting movement of the support members, the guiding means being arranged to cause each of the support members to move in an arcuate movement around the axis of rotation of the disintegration member so as to maintain a constant distance between the disintegration member and the respective support member.

23. The apparatus according to claim 16 wherein each of the side walls of the hopper is shaped in cross section substantially as an arc of a circle surrounding a longitudinal axis of the hopper parallel to and spaced above the axis of the disintegration member and wherein the base portion is part cylindrical surrounding the axis of the disintegration member and having a radius of curvature substantially equal to an outside radius of the disintegration member.

24. The apparatus according to claim 23 wherein the elongate exit means is arranged at one side of the base portion below the respective side wall.

* * * * *